Feb. 13, 1968     J. D. SKEWIS     3,368,398
TACKMETER
Filed April 27, 1965     4 Sheets-Sheet 3
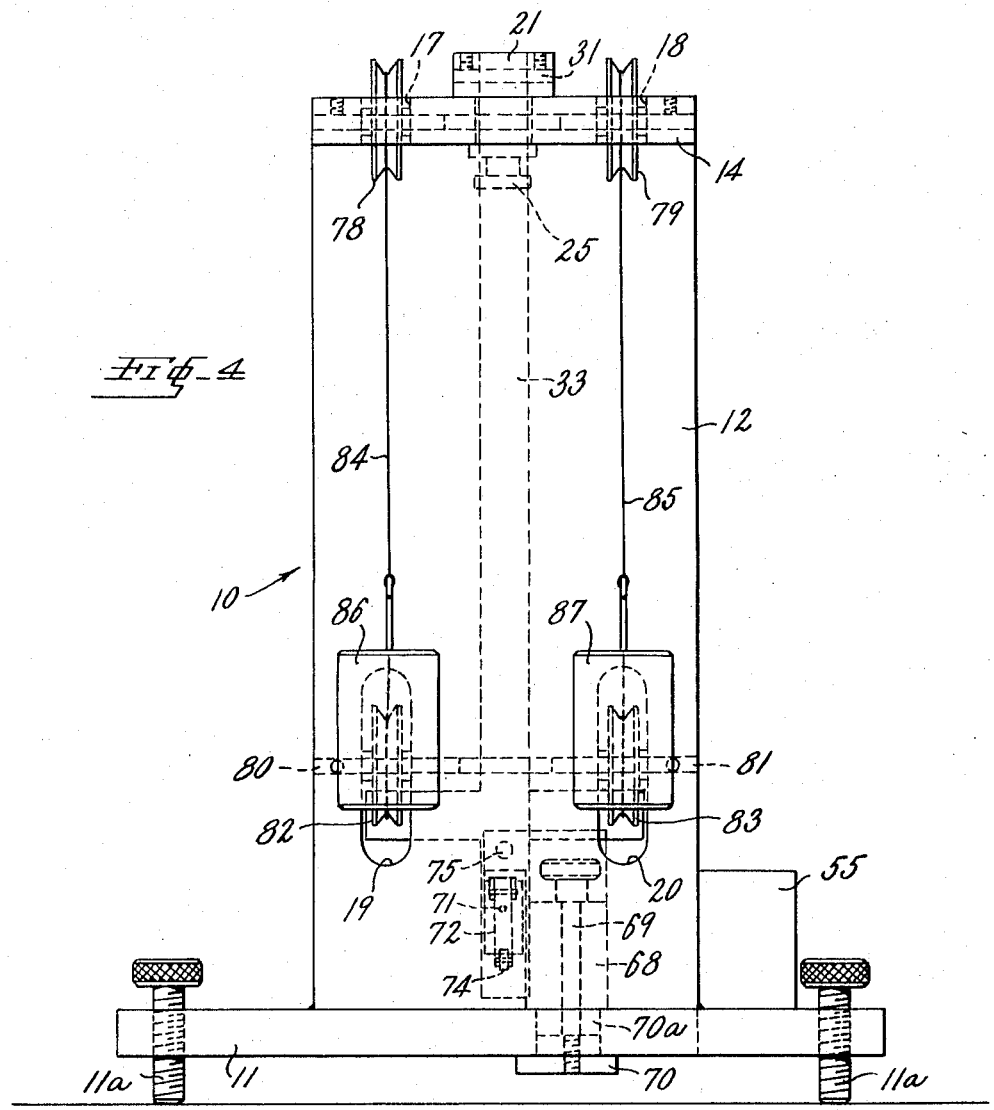
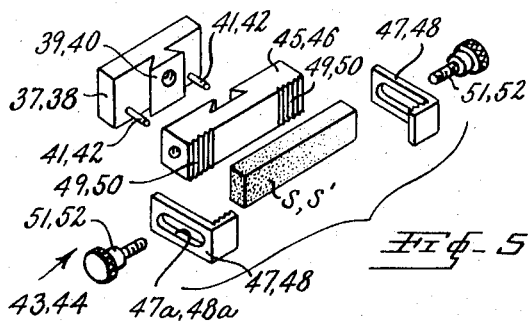
INVENTOR.
JOHN D. SKEWIS
BY Norbert P. Holler
ATTORNEY

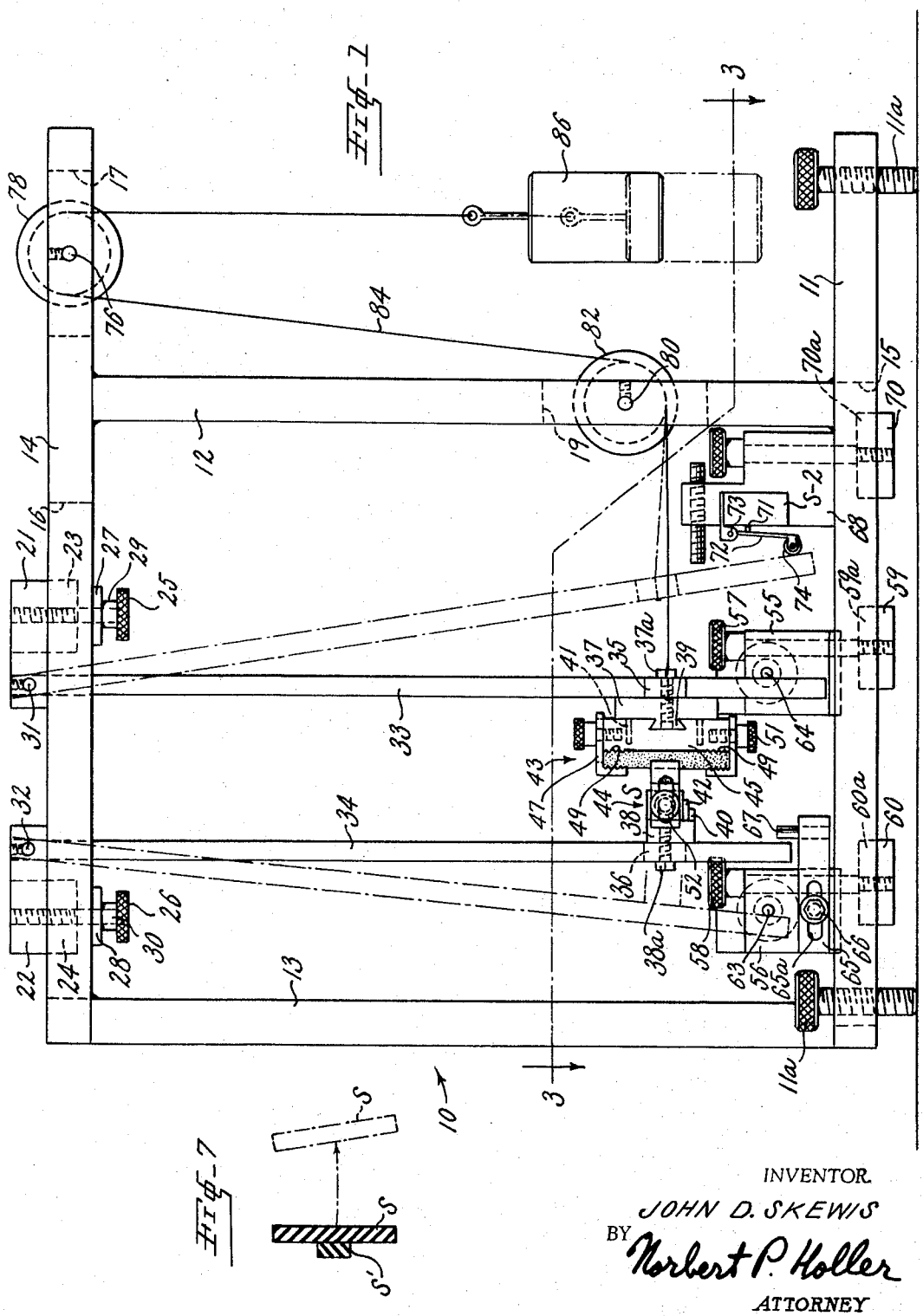

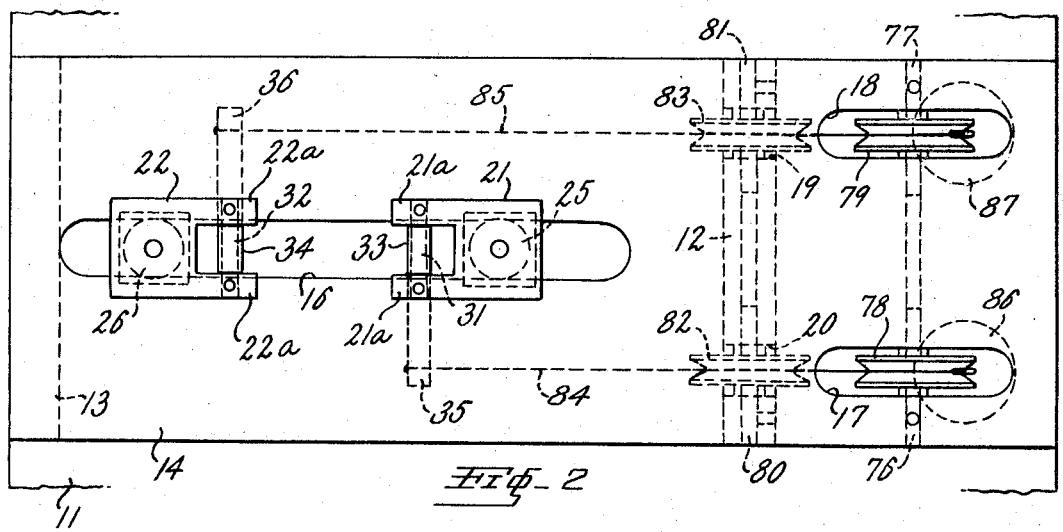
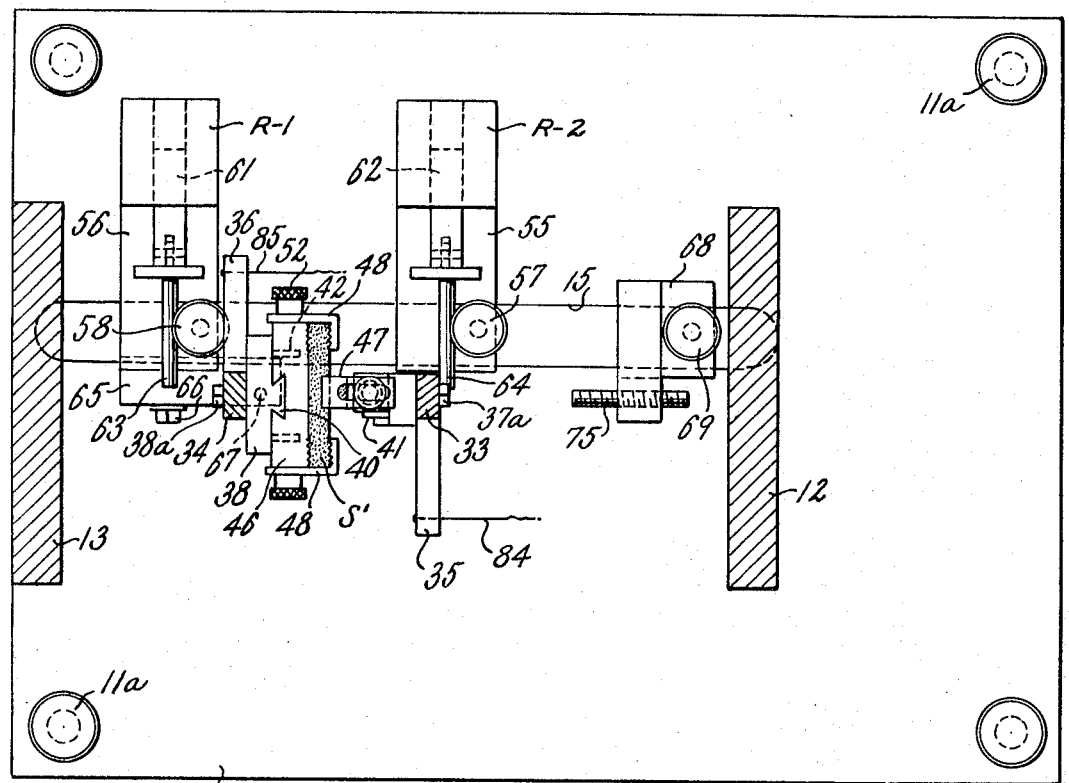

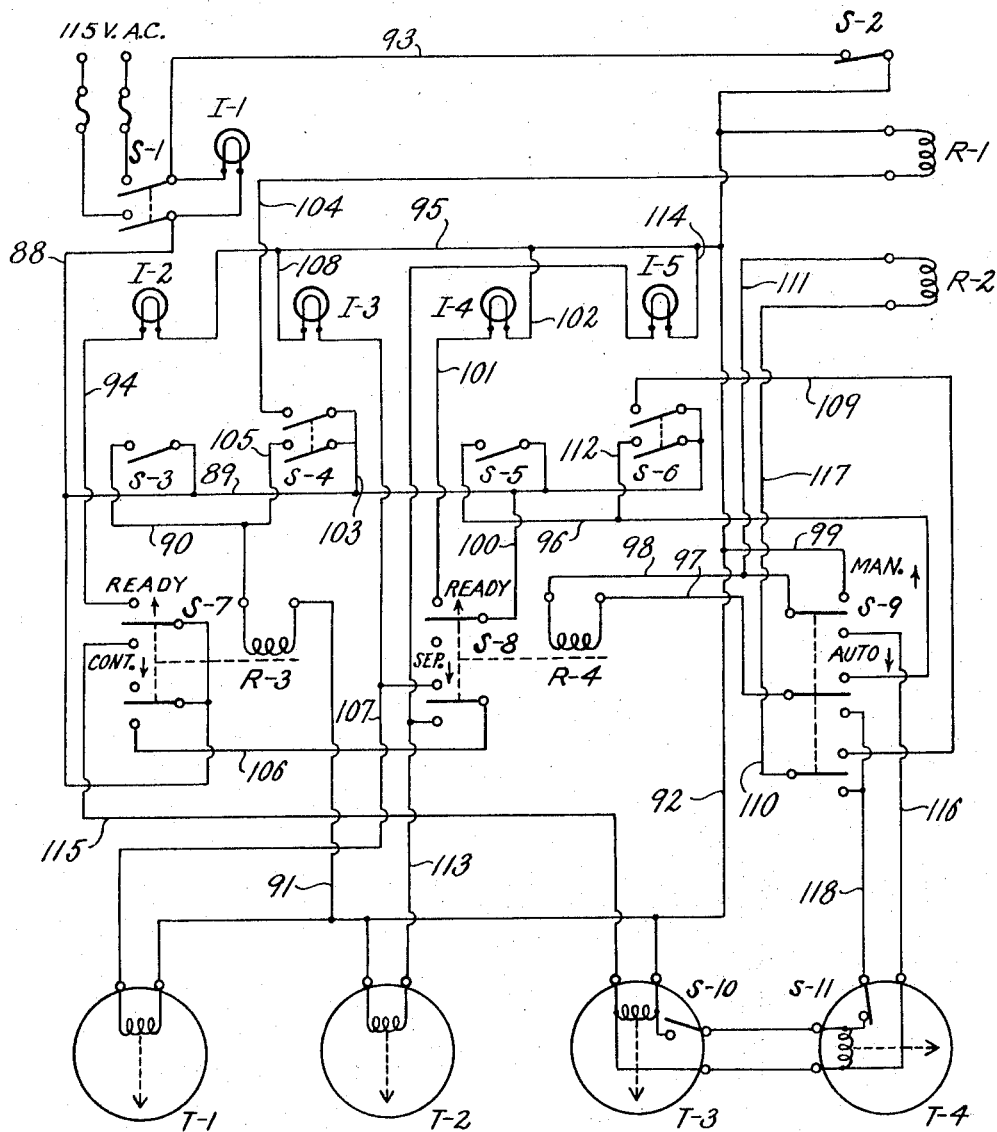

United States Patent Office 3,368,398
Patented Feb. 13, 1968

3,368,398
TACKMETER
John D. Skewis, Grosse Pointe Park, Mich., assignor to
Uniroyal, Inc., a corporation of New Jersey
Filed Apr. 27, 1965, Ser. No. 451,227
10 Claims. (Cl. 73—150)

ABSTRACT OF THE DISCLOSURE

A method and apparatus for testing and determining an index of the tack properties of rubbery or polymeric compositions. Two test specimens of polymer stock are first pressed together under a first constant static force for a predetermined time interval, and immediately thereafter the time required to re-separate the specimens under a second constant static force is measured. A tack index for the tested polymer is defined as the ratio of (a) the product of the separating force and an exponential function of the time of its application to (b) the product of the pressing force and an exponential function of the time of its application.

Background of the invention

This invention relates to the art of measuring tack, and in particular to a novel process of and apparatus for measuring the tacky adhesion properties of rubbery or polymeric compositions.

In the rubber industry, an important consideration in the choice of rubber to be used in manufacturing various products is the property generally referred to as "building tack" which is an expression of the quality of the adhesion between adjacent layers or surfaces of rubber and/or rubber-coated fabrics of which the ultimate end products are built. Many attempts have heretofore been made to provide a quantitative measurement of this property, but the results have been neither reliable nor universally accepted since all such procedures involve a measurement of the maximum force required to separate a specimen of the material from another like specimen or from a different type of material. As is well known, this force increases with the rate of pull of one specimen from the other, and in certain procedures known as "peel tests" depends also on the peeling angle. These parameters are, however, not uniquely related to the conditions to which the material may be subjected during manufacturing processes.

Summary of the invention

It is an important object of the present invention, therefore, to provide a novel process of and apparatus for measuring tack or tacky adhesion of rubbery or polymeric materials.

Another object of the present invention is the provision of such process and apparatus which enable tack of rubbery or polymeric materials to be expressed in the form of a numerical index of tackiness which is empirically determined and independent both of the magnitude of the force used in pulling the specimens apart and of the rate at which the specimens are separated.

More particularly, it is an object of the present invention to provide such process and apparatus which enable the tack index for any given rubbery or polymeric material to be quantitatively expressed as a function of the ratio of the force under which the specimens are contacted multiplied by a fractional power term of the time of such contact, to the force employed to separate the specimens multiplied by a corresponding power term of the time required to effect such separation.

It is also an object of the present invention to provide a novel tack meter which is of greatly simplified construction and is universally adjustable to permit separate measurements on different thicknesses of specimens to be carried out under identical conditions.

Brief description of the drawings

The foregoing and other objects, characteristics and advantages of the present invention will be more clearly understood from the following detailed description thereof when read in conjunction with the accompanying drawings, in which:

FIG. 1 is a front elevational view of a tack measuring apparatus, hereafter called a tackmeter, constructed in accordance with the principles of the present invention;

FIG. 2 is a fragmentary top plan view of the said tackmeter;

FIG. 3 is a sectional view taken along the line 3—3 in FIG. 1;

FIG. 4 is a side elevational view of the tackmeter as seen from the right in FIG. 1;

FIG. 5 is an exploded isometric view of one of the specimen holders and mounting arrangements therefor employed in the tackmeter of this invention;

FIG. 6 is an isometric view of a detail of the specimen holder shown in FIG. 5 but reversed to illustrate a feature thereof;

FIG. 7 is a diagrammatic illustration of the disposition of the specimens during a measurement; and FIG. 8 is a schematic electrical circuit diagram of the controls for the tackmeter.

Preferred embodiments

Referring now to the drawings in greater detail, it will be seen that the tackmeter 10 according to the present invention comprises a base plate 11 provided with leveling feet 11a. Mounted on and rigidly secured to the base plate 11 are two spaced, parallel, vertically extending side plates 12 and 13 to the uppermost ends of which is rigidly secured a top plate 14. The base plate 11 of the so-constituted framework is provided with an interior elongated opening or slot 15 extending the full distance from the side plate 12 to the side plate 13 (see FIG. 3). Similarly, the top plate 14 is provided with an interior elongated opening or slot 16 which is somewhat shorter than and is laterally offset with respect to the slot 15 (see FIGS. 2 and 4). The top plate 14 is further provided in the section thereof extending beyond the side plate 12 away from the opening 16 with a pair of parallel, relatively short, elongated slots or openings 17 and 18, while the side plate 12 is provided in the lower half thereof with a pair of parallel, relatively short, elongated slots or openings 19 and 20 which are in the same vertical planes, respectively, with the openings 17 and 18.

The top plate 14 supports a pair of blocks 21 and 22 which straddle the opening 16 and have downwardly depending reduced-width portions 23 and 24, respectively, (see FIG. 1) smoothly sideably received in the opening 16. The blocks 21 and 22 can be adjusted and fixed in position by means of knurled headed screws 25 and 26 which extend into the blocks from below the plate 14, through respective washers 27 and 28 abutting against the bottom surface of the top plate 14, and through respective spacer rings 29 and 30 interposed between the said washers and the screw heads.

The blocks 21 and 22 are further provided with respective pairs of arms 21a and 22a (FIG. 2) adjacent the opposite sides of the opening 16 which fixedly support respective pins 31 and 32. Swingably supported by these pins are two downwardly depending arms 33 and 34 which, near their lower ends, have respective lateral extensions 35 and 36. At the level of the extensions 35 and 36, the arms 33 and 34 carry respective tenon blocks 37 and 38 (FIGS. 1, 3 and 5) which are secured to the arms by screws or bolts 37a and 38a. The arrangement is such that the tenon 39 of the block 37 is disposed in a horizontal plane, and that the tenon 40 of the block 38 is disposed in a vertical plane. The blocks 37 and 38 are further provided with respective pairs of abutment or stop pins 41 and 42 disposed at opposite sides of the tenons 39 and 40 adjacent one end thereof, the pins 41 being radially aligned in a vertical plane and the pins 42 in a horizontal plane, as seen in FIG. 1.

Supported by the tenon blocks 37 and 38 are two specimen holders 43 and 44 comprising respective mortise blocks 45 and 46 and associated pairs of clamp members 47 and 48. The blocks 45 and 46 are adapted to be slidably fitted onto the tenons 39 and 40 from one end thereof up to the extent permitted by the stop pins 41 and 42, and are provided at the opposite end regions of their respective unrecessed faces with teeth or serrations 49 and 50. The L-shaped clamp members 47 and 48, which are provided in their longer legs with elongated slots 47a and 48a, are adjustably secured to the blocks by means of shouldered screws 51 and 52 treaded into the ends of the respective mortise blocks through the slots 47a and 48a. The shorter and transverse legs 47b and 48b of the clamp members 47 and 48 extend over the associated serrated surface portions of the blocks 45 and 46 and are likewise provided on their inner surfaces with teeth or serrations 53 and 54 (see FIG. 6) corresponding to the teeth 49 and 50 on the mortise blocks 45 and 46. It will be apparent, therefore, that the clamp members 47 and 48 can be adjusted relative to their respective mortise blocks 45 and 46 so as to dispose the serrated legs 47b and 48b at any desired distances from the serrated faces of the blocks 45 and 46 to accommodate specimens S and S' of corresponding thicknesses.

Referring further to FIGS. 1 and 3, the base plate 11 supports a pair of detent blocks 55 and 56 which straddle the opening 15 directly adjacent the paths of swinging movement of the arms 33 and 34 and are provided with screws 57 and 58 extending downwardly through the opening 15, the lowermost end regions of these screws being threaded into respective clamping blocks 59 and 60 of inverted T-shaped cross-section the reduced width portions 59a and 60a of which are smoothly slidably received in the opening 15 from below the latter. Loosening of the screws 57 and 58 thus permits adjustment of the location of the blocks 55 and 56, while tightening the screws to draw the relatively wider cross webs of the members 59 and 60 against the lower surface of the base plate 11 effects a locking of the blocks 55 and 56 to the plate in their adjusted positions.

The blocks 56 and 55 support respective solenoids R-1 and R-2 the cores 61 and 62 of which are movable transversely to the longitudinal dimension of the opening 15 and are connected at their ends facing the said opening with respective detent pins 63 and 64. The arrangement is such that when the solenoids are de-energized, the pins 63 and 64 can be manually shifted to project across the paths of movement of the arms 34 and 33 as shown in FIG. 3, while when the solenoids are energized the pins are retracted away from said paths and out of their positions illustrated in FIG. 3.

The detent block 56 further carries adjacent one side thereof a block 65 which is adjustably secured to the detent block in the plane of movement of the arm 34 by means of a screw 66 extending through an elongated slot 65a in the block 65. Due to the presence of the latter, the arm 34 is made somewhat shorter than the arm 33. At its end directed toward the arm 33, the block 65 carries an upwardly extending stop pin 67. The respective functions of the pins 63, 64 and 67 will be more fully explained presently.

Also mounted on the base plate 11 between the detent block 55 and the vertical side plate 12 is a switch block 68 through which extends a screw 69 threaded at its lowermost end into a clamping block 70 which, in the same manner as the blocks 59 and 60, has a reduced width portion 70a slidably received in the opening 15 so as to permit the block 68 to be selectively adjusted on and locked to the base plate 11. The block 68 supports a microswitch S-2 having an operating plunger 71 which is adapted to be engaged by a lever or arm 72 pivotally secured to the switch housing at 73 and carrying at its free end a roller 74 adapted to be engaged by the lowermost end region of the arm 33 upon angular movement of the latter into the position thereof illustrated in dot-dash lines in FIG. 1. For the purpose of limiting the extent of such movement of the arm 33, thereby to prevent possible damage to the switch S-2, the block 68 carries an adjustable abutment or stop screw 75.

The solenoids R-1 and R-2 and the microswitch S-2 are electrically incorporated in a control circuit illustrated in FIG. 8, the details of which will be more fully explained hereinafter in connection with the description of the operation of the tackmeter according to this invention.

As clearly shown in FIGS. 1, 2 and 4, the top plate 14 is provided with a pair of axles or shafts 76 and 77 extending across the openings 17 and 18, respectively, on which axles are rotatably supported respective pulley wheels 78 and 79. Similarly, the vertical plate 12 supports a pair of fixed axles or shafts 80 and 81 extending across the openings 19 and 20, respectively, on which are rotatably mounted respective pulley wheels 82 and 83. Trained under the pulleys 82 and 83 and over the pulleys 78 and 79 are two flexible cords or cables 84 and 85, respectively, which are secured at one end to the extensions 35 and 36 of the specimen-supporting arms 33 and 34, and at their other ends to a pair of weights 86 and 87, which tend to pull the arms to the right as seen in FIG. 1.

The operation of the tackmeter according to the present invention is as follows:

As a starting condition, the two specimens S and S' of polymer stock, e.g. rubber strips suitably cut or molded to shape and thickness, are secured to the unmounted specimen holders 43 and 44 by first loosening the screws 51 and 52, then (see FIG. 5) inserting the respective specimens into the spaces between the mortise blocks 45 and 46 and the legs 47b and 48b their associated clamp members 47 and 48, and finally bringing said legs tightly against the outer faces of the specimens and locking them in position by means of the screws 51 and 52. The specimens are thus secured to their respective mortise blocks, and by virtue of the spacing of the said legs on each holder, a central region of each specimen is left unobstructed for ultimate contact with the corresponding central region of the other specimen. The holders 43 and 44 are now mounted on the arms 33 and 34 by simply sliding the mortise blocks 45 and 46 onto the respective tenons 39 and 40, until the block 45 abuts against the pins 41, and the block 46 against the pins 42, thereby disposing the specimens at right angles to each other. During this mounting operation, the arm 33 is disposed in its solid-line position illustrated in FIG. 1, i.e. to the left of the solenoid-operated detent pin 64, and is maintained in contact therewith by the force of the weight 86 acting on the arm 33 through the cable 84. Concurrently, the arm 34 is disposed in its broken-line position illustrated in FIG. 1, i.e. to the left of the detent pin 63, being retained there against by the force of the weight 87 acting on the arm 34 through the cable 85. The microswitch S-2 is normally closed when the lever 72 is not depressed by the arm 33.

With the apparatus so set, to perform a measurement the master switch S-1 (FIG. 8) is closed to supply power for the entire control circuit from a standard 115 volt A.C. line, which condition is indicated by the lighting of the lamp I-1 on a suitable control panel (not shown). The triple-pole double-throw switch S-9 may then be moved to either of its two operating positions, depending on whether manual or automatic operation is desired.

Assuming now that the switch S–9 has been shifted into its "manual" position, manual closure of a momentary switch S–3 completes the energization circuit for the coil of a relay R–3 through the lines 88 to 93 and switch S–2, which shifts the ratcheting contacts S–7 of the relay into their "ready" position. This closes the circuit for the green panel lamp I–2 through the lines 88, 94, 95, 92 and 93, whereby the lamp lights and gives a visual indication that the relay contacts S–7 are in the "ready" position.

Manual closure of the momentary switch S–5 now completes the energization circuit for the coil of a relay R–4 through the lines 88, 89, 96 to 99, 92 and 93, the upper two contacts of the switch S–9, and microswitch S–2, which shifts the ratcheting contacts S–8 of this relay to the "ready" position thereof. This closes the circuit for the green panel lamp I–4 through the lines 88, 89, 100, 101, 102, 95, 92 and 93, whereby the lamp lights and gives a visual indication that these relay contacts are in the "ready" position.

When these conditions obtain, a manual closure of the double-pole single-throw momentary switch S–4 completes the energization circuit for the coil of solenoid R–1 through the lines 88, 89, 103, 104, 92 and 93, whereby the detent pin 63 is retracted and permits the arm 34 to swing under the force of the weight 87 from its broken-line position in FIG. 1 to its solid-line position. The initial adjustment of the blocks 21 and 22 on the top plate 14, of the blocks 55 and 56 on the base plate 11, and of the block 65 relative to the block 56 is such that, taking into account the thicknesses of the specimens S and S', when the two specimens come into face to face engagement, as illustrated diagrammatically in solid lines in FIG. 7, the lowermost end of the arm 34 is disposed just short of the stop pin 67, as shown in FIGS. 1 and 3. Simultaneously with the foregoing, the closure of switch S–4 completes the energization circuit for the relay coil R–3 through the lines 88, 89, 103, 105 and 91 to 93, which throws the contacts S–7 into their "contact" position. This completes the energization circuit, through the switch contacts S–8 (which are still in their "ready" position) and through the lines 88, 106, 107, 92 and 93, for the timer T–1 to set the latter into operation for measuring the period of time during which contact between the specimens S and S' is maintained under the force of the weight 87. Concurrently, the circuit for the red panel lamp I–3 is closed through the lines 88, 106, 107, 108, 95, 92 and 93, whereby this lamp lights so as to give a visual indication that the samples are in contact under pressure.

After the desired interval of contact for which the timer T–1, e.g. an electric stopwatch, has been set, a manual closure of the double-pole single-throw momentary switch S–6 completes the energization circuit for the coil of the solenoid R–2 through the lines 88, 89, 109, 110, 111, 99, 92 and 93 and the top and bottom contacts of switch S–9, whereby the detent pin 64 is retracted from behind the arm 33 to permit the weight 86 to become effective to pull the said arm to the right out of its solid-line position in FIG. 1. Almost immediately, of course, the arm 34 comes up against the stop pin 67. Since further movement of this arm under the force of the weight 87 is now arrested, the specimens S and S' are no longer being pressed together but instead are being pulled apart by the weight 86.

Reverting now to the control circuit, simultaneously with the foregoing, the closure of the switch S–6 completes the energization circuit for the coil of relay R–4 through the lines 88, 89, 112, 96 to 99, 92 and 93 and the top and middle contacts of switch S–9, which throws the relay contacts S–8 into their "separation" position. This breaks the circuit for the timer T–1 and completes the energization circuit for the timer T–2 through the line 88, the lower one of the relay contacts S–7 (which are still in their "contact" position) and the lines 106, 113, 92 and 93, whereby the timer T–2, e.g. an electric stopwatch, is set into operation to measure the period of time during which the specimens are being pulled apart. The existence of this condition is indicated by the lighting of the red panel lamp I–5 when its circuit is closed through the lines 88, 106, 113, 114, 95, 92 and 93.

When the specimens become completely separated, the arm 33 swings freely to the right, as indicated in broken lines in FIGS. 1 and 7, under the force of the weight 86 and engages the roller 74 to depress the operating lever 72 and plunger 71, whereby the microswitch S–2 is opened. This breaks the entire circuit. The timer T–2 is thus stopped and gives an indication of the length of time required for the separation process.

If an automatic control of the measuring operation is desired, the switch S–9 is shifted into its "automatic" position, i.e. down in FIG. 8, whereupon with the master switch S–1 and microswitch S–2 both closed, the specimen holders 43 and 44 properly loaded and mounted, and the arms 33 and 34 properly positioned, the momentary switches S–3 and S–5 are manually closed in sequence to shift the relay contacts S–7 and S–8 into their "ready" positions as previously described, which condition is indicated by the lighting of the green panel lamps I–2 and I–4. The timer T–3, e.g. a "Bra-Lab" Model 8630 timer, is set to the desired time for pressing the specimens together, and the timer T–4, e.g. a "Bra-Lab" Model 8620 timer, is set to an arbitrarily chosen period of several seconds which is not critical to the measurement but serves to limit the period of time during which current flows through the coils of relays R–2 and R–4, so as to prevent excessive heating of these coils.

With both sets of relay contacts S–7 and S–8 in their "ready" positions, upon closure of the momentary switch S–4 the solenoid R–1 is energized, as described so as to retract the detent pin 63 and permit the arm 34 to swing into its solid-line position in FIG. 1 wherein the specimen S' engages and is pressed against the specimen S under the action of the weight 87. Also, as the switch S–4 is closed, the relay R–3 is reenergized to throw the contacts S–7 thereof into the "contact" position. With the contacts S–8 still in their "ready" position, this completes the energization circuit for the timer T–1 so as to set the same into operation to measure the period of time during which the specimens are pressed into contact. This condition is again indicated by the lighting of the red panel lamp I–3.

At the same time, the shifting of the contacts S–7 to their "contact" position completes the energization circuit for the timer T–3 through the lines 88, 115, 92 and 93 to set this timer into operation. As soon as the desired period of contact of the specimens under pressure has passed, for which period the timer T–3 has been set, the normally open switch S–10 in the timer T–3 closes which causes current to flow through the timer T–4. With the switch S–11 in the timer T–4 normally closed, the energization circuits for the solenoid R–2 and the relay R–4 are thus completed, through the lines 116, 111, 117 and 118, and through the lines 116, 98, 97 and 118, respectively. As previously described, the energization of the solenoid R–2 causes the detent pin 64 to be retracted and the specimens to be separated under the force of the weight 86, while the energization of the relay R–4 throws the contacts S–8 thereof into their "separation" position. The duration of the flow of current through these two coils is limited to the several seconds pre-set on the timer T–4, since the switch S–11 of the same will open after such pre-set time interval.

When the contacts S–8 are thrown into their "separation" position as described, the circuit for the timer T–1 is interrupted and the circuit for the timer T–2 completed to measure the time required for the specimens to separate. As soon as the specimens separate, the arm 33 swings freely to the right in FIG. 1 and causes the microswitch S–2 to be opened, which breaks the entire circuit and stops the timer T–2 to indicate the length of time required for the separation process.

From the foregoing it will be seen that the performance of a tack measurement in accordance with the principles of the present invention makes use of only four factors, to wit the contact force $F_c$ under which the specimens are pressed into contact, the time $t_c$ during which this force is applied, the break force $F_b$ under which the specimens are pulled apart, and the time $t_b$ that is required for separation to occur. It is to be noted that both of these forces are essentially static in nature, and that the movement of the arm 34 in bringing the specimen S' into contact with the specimen S' is extremely limited, whereby any possible influence of either kinetic energy or momentum on the results of the measurement is effectively minimized. Accordingly, I have determined empirically that the tack index of tacky rubber at suitably low values of $F_c$ and $t_c$ can be expressed as the ratio $$\frac{F_b(t_b)^x}{F_c(t_c)^x}$$

where $x$ is a fractional power less than unity, generally between about 0.25 and 0.5 and preferably approximately ⅓ or so, e.g. 0.3. This ratio is relatively independent of the conditions of the measurement, since the two products of force and time for any given material are essentially constants, as will be readily understood when it is considered that if either $F_c$ or $F_b$ is increased, the corresponding time $t_c$ or $t_b$ is decreased, and vice versa.

In the final analysis, therefore, the present invention provides a novel tack measurement which depends practically only on the rheological properties of the material being tested, i.e. on the rate of growth of the interfacial contact area between the two specimens, which is the actual characteristic that is most useful for evaluating the behavior of the material under manufacturing conditions, such as in the fabrication of tires.

It will also be apparent that the construction of the specimen holders 43 and 44 and the means of mounting them on the arms 33 and 34 provides additional advantages. Thus, the use of the mortise and tenon arrangements not only enables the tackmeter to be equipped with a plurality of sets of specimen holders, so that while one set is in use for a measurement, another set can be loaded and readied for a subsequent measurement, but also greatly facilitates the mounting and demounting of the specimen holders. Further, the disposition of the holders at right angles to each other ensures that the area of contact between any two specimens being tested will always be known and precisely the same as the area of contact between any other two specimens being tested. Also, by virtue of this arrangement the area of contact is kept relatively small, which, in conjunction with the adjustability of the arm-supporting blocks 21 and 22 and the detent blocks 55 and 56, greatly facilitates the proper parallel positioning of the contact faces of the specimens at the time of contact, so as to minimize and as far as possible eliminate any effects that a relative oblique orientation of the contact faces might have on or introduce into the results of the measurement.

It is to be understood that the foregoing description of a preferred embodiment of the tack measuring process and apparatus according to this invention is intended to be illustrative only, and that the structural and operational features and relationships disclosed may be varied and modified in a number of ways none of which entails a departure from the spirit and scope of the present invention as defined in the hereto appended claims. Merely by way of example, in lieu of employing the blocks 21 and 22 to effect a slidable adjustability of the pivot axes of the arms 33 and 34, the adjustment of these axes may be achieved by providing in the top plate 14 two sets of parallel, axially aligned, horizontal bores at the opposite sides of the opening 16 and perpendicular to the longitudinal dimension of the latter, into which respective pivot pins for the arms 33 and 34 can be selectively inserted.

Having thus described my invention, what I claim and desire to secure by Letters Patent is:

1. The process of measuring tack of rubbery or polymeric compositions, comprising the steps of bringing two specimens of polymer stock into face to face contact under a first constant static force directed substantially perpendicularly to the plane of the area of contact, maintaining said contact under said first force for a predetermined time interval, substantially immediately upon termination of said time interval removing said first force and applying to said specimens a second constant static force directed substantially perpendicularly to the plane of the area of contact for pulling said specimens apart, and measuring the length of time required from the instant of application of said second force to effect the complete separation of said specimens.

2. The process of measuring tack of rubbery or polymeric compositions, comprising the steps of holding a first specimen of polymer stock immobile, bringing a second specimen of polymer stock slowly into surface contact with said first specimen, applying to said second specimen over a predetermined time interval starting with the beginning of contact between said specimens a first constant static force directed substantially perpendicularly to the plane of the area of contact between said specimens to press said second specimen against said first specimen, substantially immediately upon termination of said time interval releasing said first specimen and immobilizing said second specimen, simultaneously therewith applying to said first specimen a second constant, static force directed substantially perpendicularly to the plane of the area of contact between said specimens for pulling said first specimen away from said second specimen, and measuring the length of time required from the instant of application of said second force to effect the complete separation of said specimens.

3. The process of claim 2, wherein an arrangement of said specimens relative to each other is used which provides a limited and known predetermined area of contact therebetween.

4. Apparatus for measuring tack of rubbery or polymeric compositions, comprising respective means for holding two specimens of polymer stock, means for effecting a relative approach of said holding means to bring said specimens into face to face contact with each other, means for applying to said holding means a first constant static force directed substantially perpendicularly to the plane of the area of contact between said specimens for pressing said specimens together, means rendered active only after the passing of a preset time interval for applying to said holding means a second constant static force directed substantially perpendicularly to the plane of the area of contact between said specimens for pulling said specimens apart, and means for measuring the time required to effect the complete separation of said specimens.

5. Apparatus for measuring tack of rubbery or polymeric compositions, comprising respective means for holding a pair of specimens of polymer stock with their exposed faces directed toward each other, means for supporting said holding means for relative coplanar movement toward and away from each other, means for effecting a relative approaching movement of said holding means to bring said specimens into face to face contact with each other under a first constant static force directed substantially perpendicularly to the plane of the area of contact between said specimens, means operable upon passage of preset time interval of such contact for effecting a relative separating movement of said holding means under a second constant static force directed substantially perpendicularly to the plane of the area of contact between said specimens, and means for measuring the length of time required from the instant of application of said second force for effecting the complete separation of said specimens.

6. Apparatus according to claim 5, said holding means being provided with means for gripping the respective specimens so as to provide a limited and known predetermined area of contact therebetween.

7. Apparatus according to claim 5, further comprising means for inhibiting any movement of one of said holding means during said relative approaching movement under the application of said first force to the other of said holding means, and means for inhibiting any movement of said other holding means during said relative separating movement under the application of said second force to said one holding means.

8. Apparatus for measuring tack, comprising first and second arms pivotally mounted for angular movement about respective parallel horizontal axes, a pair of specimen holders supported by said arms, respectively, so as to direct the exposed surfaces of the specimens toward each other, first and second weight means connected with said first and second arms, respectively, so as to tend to pull the latter in the same direction about said axes, first and second detent means arranged normally to extend into the respective paths of movement of said first and second arms intermediate the latter and said weight means so as to inhibit movement of said arms under the action of said weight means, first and second solenoid means connected with said detent means and operable when energized to retract the latter from said paths of movement, whereby upon energization of said first solenoid means, while said second solenoid means remains deenergized, the retraction of said first detent means permits said first weight means to move said first arm toward said second arm so as to bring the two specimens into face to face contact under the force of said first weight means, third detent means interposed in said path of movement of said first arm just beyond the position reached by the latter when said specimens are in contact, whereby upon subsequent energization of said second solenoid means the retraction of said second detent means permits said second weight means to exert a pulling force on said second arm, while movement of said first arm is restrained by said third detent means, thereby to tend to separate said specimens under the force of said second weight means, and an electrical control circuit having incorporated therein said first and second solenoid means, a first electric timer arranged to be started simultaneously with the energization of said first solenoid means and to be stopped simultaneously with the energization of said second solenoid means, a second electric timer arranged to be started simultaneously with the energization of said second solenoid means, and switch means arranged to be activated to break the circuit and thereby stop said second electric timer in response to movement of said second arm upon complete separation of said specimens.

9. Apparatus according to claim 8, further comprising means for adjusting the relative positions of said axes and said detent means to accommodate specimens of different thicknesses.

10. Apparatus according to claim 8, said control circuit further having incorporated therein a third electric timer arranged to be started simultaneously with said first timer and set to regulate the time interval between the energization of said first and second solenoid means.

References Cited

UNITED STATES PATENTS 2,070,862   2/1937   Healy _____ 73—58
3,129,586   4/1964   Allen et al. _____ 73—150 XR DAVID SCHONBERG, *Primary Examiner.*

UNITED STATES PATENT OFFICE
CERTIFICATE OF CORRECTION

Patent No. 3,368,398　　　　　　　　　　　　　　　February 13, 1968

John D. Skewis

It is certified that error appears in the above identified patent and that said Letters Patent are hereby corrected as shown below:

Column 6, lines 23 and 25, "Bra-Lab", each occurrence, should read -- Gra-Lab --. Column 10, after line 33, insert 2,601,782　　7/1952　　Foreman et al---73-150

Signed and sealed this 5th day of August 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents